United States Patent
Yatake et al.

(10) Patent No.: US 6,830,612 B1
(45) Date of Patent: Dec. 14, 2004

(54) INK FOR INK JET RECORDING

(75) Inventors: Masahiro Yatake, Nagano-Ken (JP);
Hiroto Nakamura, Nagano-Ken (JP);
Hidehiko Komatsu, Nagano-Ken (JP)

(73) Assignee: Seiko Epson Corporation, Tokyo-To (JP)

( * ) Notice: Subject to any disclaimer, the term of this patent is extended or adjusted under 35 U.S.C. 154(b) by 0 days.

(21) Appl. No.: 09/660,012

(22) Filed: Sep. 12, 2000

Related U.S. Application Data

(63) Continuation-in-part of application No. 09/370,783, filed on Aug. 5, 1999, now abandoned.

(30) Foreign Application Priority Data

| Aug. 6, 1998 | (JP) | 10/223479 |
| Sep. 25, 1998 | (JP) | 10/272094 |
| Oct. 23, 1998 | (JP) | 10/302818 |
| Oct. 23, 1998 | (JP) | 10/302819 |
| Mar. 12, 1999 | (JP) | 11/067158 |
| Dec. 28, 1999 | (JP) | 11/375316 |

(51) Int. Cl.$^7$ .......................... C09D 11/00
(52) U.S. Cl. .............. 106/31.58; 106/31.86; 106/31.59; 106/31.89
(58) Field of Search ............ 106/31.58, 31.86, 106/31.59, 31.89

(56) References Cited

U.S. PATENT DOCUMENTS

| 2,083,372 A | 6/1937 | Guthmann | 134/28 |
| 3,291,580 A | 12/1966 | Malick | 44/53 |
| 4,458,176 A | 7/1984 | Chenot | 313/487 |
| 4,597,794 A | 7/1986 | Ohta | 106/20 |
| 4,985,077 A | * 1/1991 | Ise et al. | 106/31.58 |
| 5,156,675 A | 10/1992 | Breton | 106/22 |
| 5,169,436 A | * 12/1992 | Matrick | 106/31.58 |
| 5,180,425 A | * 1/1993 | Matrick et al. | 106/31.58 |
| 5,183,502 A | 2/1993 | Meichsner | 106/22 K |
| 5,196,056 A | 3/1993 | Prasad | 106/15.05 |
| 5,356,464 A | * 10/1994 | Hickman et al. | 106/31.36 |
| 5,428,384 A | 6/1995 | Reichtsmeier | 347/102 |
| 5,479,199 A | 12/1995 | Moore | 347/102 |
| 5,776,230 A | * 7/1998 | Gundlach et al. | 106/31.27 |
| 5,993,524 A | * 11/1999 | Nagai et al. | 106/31.27 |
| 6,231,655 B1 | * 5/2001 | Marritt | 106/31.43 |
| 6,261,349 B1 | * 7/2001 | Nagai et al. | 106/31.27 |
| 6,379,443 B1 | * 4/2002 | Komatsu et al. | 106/31.58 |
| 6,454,846 B2 | * 9/2002 | Yatake | 106/31.58 |

FOREIGN PATENT DOCUMENTS

| EP | 0336673 | 10/1989 |
| EP | 0447896 | 9/1991 |
| EP | 0592774 | 4/1994 |
| EP | 0769536 | 4/1997 |
| EP | 0769537 | 4/1997 |
| JP | 58002364 | 1/1983 |
| JP | 5330032 | 12/1993 |
| JP | 8-333532 | 12/1996 |
| JP | 9-208870 | 8/1997 |
| JP | 9-237355 | 9/1997 |
| JP | 10-46074 | 2/1998 |
| JP | 10-46075 | 2/1998 |
| JP | 11-314029 | 11/1999 |

OTHER PUBLICATIONS

Patent Abstract of Japan of 58002364 dated Jan. 7, 1983.
Patent Abstract of Japan of JP 5330032 dated Dec. 14, 1993.

* cited by examiner

Primary Examiner—Mark L. Bell
Assistant Examiner—Veronica F. Faison
(74) Attorney, Agent, or Firm—Ladas & Parry

(57) ABSTRACT

An ink is provided which can realize good images on various recording media, especially plain papers.

The ink comprises at least a water-soluble colorant, a water-soluble organic solvent, water, and a mixture of two or more compounds represented by formula (I):

$$R-[(EO)n-(PO)m]k-T$$

wherein
EO represents an ethyleneoxy group;
PO represents a propyleneoxy group;
T represents an OH group or $SO_3M$ wherein M represents a hydrogen atom, an alkali metal, an inorganic base, or an organic amine;
m and n are each an integer;
k is a natural number of not less than 1; and
R represents an alkyl or cyclic group.

19 Claims, No Drawings

INK FOR INK JET RECORDING

This application is a continuation-in-part application of Ser. No. 09/370,783, filed on Aug. 5, 1999, and now abandoned.

BACKGROUND OF THE INVENTION

1. Field of the Invention

The present invention relates to an ink for ink jet recording which can produce high-quality printed images on various recording media, and an ink jet recording method using the same.

2. Background Art

Ink jet recording is a method wherein an ink is ejected as droplets through fine nozzles to record letters or figures onto the surface of recording media. Ink jet recording systems which have been developed and put to practical use include: a method wherein an electric signal is converted to a mechanical signal using an electrostrictive element to intermittently eject an ink reservoired in a nozzle head section, thereby recording letters or symbols on the surface of a recording medium and a method wherein an ink, reservoired in a nozzle head section, in its portion very close to the ejection portion is rapidly heated to create a bubble and the ink is intermittently ejected by volume expansion created by the bubble to record letters or symbols on the surface of a recording medium.

Properties required of inks used in the above ink jet recording are such that the drying property of the print is good, no feathering is created in prints, good printing can be performed on various recording media, and, in the case of multi-color printing, color-to-color intermixing does not occur.

In particular, prevention of feathering is important for realizing high-quality images. Paper is likely to create feathering because it comprises fibers that are different from one another in ink penetration. In particular, this tendency is significant for recycled paper because it comprises various fibers having different ink penetration. For this reason, in order to prevent the feathering, various proposals have been made on a reduction in penetration of the ink into recording media or an improvement in drying speed of the printed ink image.

For example, Japanese Patent Publication 2907/1990 proposes utilization of glycol ether as a wetting agent, Japanese Patent Publication 15542/1989 proposes utilization of a water-soluble organic solvent, and Japanese Patent Publication 3837/1990 proposes utilization of a glycol ether as a dye solubilizer.

Further, in order to improve the penetrability of an ink for ink jet recording, U.S. Pat. No. 5,156,675 proposes addition of diethylene glycol monobutyl ether, U.S. Pat. No. 5,183,502 proposes addition of surfynol 465 (manufactured by Nissin Chemical Industry Co., Ltd.) as an acetylene glycol surfactant, and U.S. Pat. No. 5,196,056 discloses addition of both diethylene glycol mono-n-butyl ether and Surfynol 465. Furthermore, U.S. Pat. No. 2,083,372 studies and teaches utilization of an ether of diethylene glycol in an ink. In this connection, diethylene glycol mono-n-butyl ether is known as butylcarbitol to those skilled in the art, and detailed description thereon is given, for example, in U.S. Pat. No. 3,291,580.

Regarding means for regulating the penetrability of the ink using a pigment, for example, Japanese Patent Laid-Open No. 147861/1981 discloses utilization of a pigment and triethylene glycol monomethyl ether in combination. Japanese Patent Laid-Open No. 111165/1997 discloses utilization of a pigment and an ether of ethylene glycol, diethylene glycol, or triethylene glycol in combination.

On the other hand, a method has been proposed wherein an ink is printed on a heated recording medium to rapidly evaporate the solvent component, thereby permitting the ink to be rapidly fixed onto the recording medium. Heating, however, is likely to have an adverse effect on recording media, particularly paper. Further, this method involves an additional disadvantage of increased power consumption by heating.

SUMMARY OF THE INVENTION

The present inventors have now found that an ink comprising a compound having a specific structure, when used in ink jet recording, can realize good images having good drying speed and no significant feathering on various recording media, especially recycled papers.

Accordingly, it is an object of the present invention to provide an ink that can realize good images on various recording media, especially plain papers.

Thus, according to one aspect of the present invention, there is provided an ink for ink jet recording, comprising at least a water-soluble colorant, a water-soluble organic solvent, water, and a mixture of two or more compounds represented by formula (I):

$$R\text{—}([(EO)n\text{-}(PO)m]\text{-}T)k \tag{I}$$

wherein

EO represents an ethyleneoxy group;

PO represents a propyleneoxy group;

T represents an OH group or $SO_3M$ wherein M represents a hydrogen atom, an alkali metal, an inorganic base, or an organic amine;

m and n are each an integer;

k is a natural number of not less than 1;

R represents a $CaH_{2a+2-k}$ group where a represents natural number of 4 to 10, an Ra—$CaH_{2a+1-k}$ group where a represents natural number of 4 to 10 and Ra represents a group represented by formula $$(T\text{—}[(PO)m'\text{-}(EO)n'])k\text{-}$$

wherein

EO, PO, T and k each are as defined above; and n' and m' are respectively n and m, EO and PO being arranged, regardless of order in the parentheses, randomly or as blocks joined together, n or n+n' being 1 to 10 with m or m+m' being 0 to 5 when n and m and n' and m' are expressed in terms of the average value for the mixture of compounds represented by formula (I) contained in the ink, or a group represented by the following formula;

$$K\text{—}M\text{—}O\text{—}$$

wherein K represents a saturated or unsaturated aromatic ring having 4 to 15 carbon atoms or a saturated or unsaturated aliphatic ring having 4 to 15 carbon atoms, M represents a bond or an alkylene group having 1 to 12 carbon atoms, and O represents an oxygen atom.

DESCRIPTION OF THE PREFERRED EMBODIMENTS

Ink for Ink Jet Recording

According to the present invention, in the case of monochrome printing, the ink for ink jet recording refers to a black ink, while in the case of color printing, the ink for ink jet recording refers to color inks, specifically a yellow ink, a magenta ink, a cyan ink, and optionally a black ink.

Compound Represented by Formula (I)

The ink for ink jet recording used in the present invention comprises a mixture of two or more compounds represented by formula (I).

In the formula (I), EO represents ethyleneoxy, that is, —$CH_2CH_2O$—, and PO represents propyleneoxy, that is, —$CH_2CH_2CH_2O$— or —$CH(CH_3)CH_2O$—. EO and PO may be arranged in the molecule of the compound represented by formula (I) (that is, in parentheses in formula (I)) in any order and may be arranged randomly or as blocks joined together.

M in $SO_3M$ represented by T represents a hydrogen atom, an alkali metal, an inorganic base, or an organic amine. Examples of alkali metals usable herein include lithium, sodium, and potassium. Inorganic bases usable herein include ammonia, and organic amines usable herein include mono-lower (preferably having 1 to 6 carbon atoms) alkylamines or di-lower (preferably having 1 to 6 carbon atoms) alkylamines. Specific examples thereof include monoethanolamine, diethanolamine, triethanolamine, monoisopropanolamine, and mono-s-butanolamine.

The $C_aH_{2a+2-k}$ group represented by R in formula (I) may be of branched or straight-chain type. In the group, a represents natural number or 4 to 10 and k represents the number of groups —[(EO)n-(PO)m]- which attach to R. Thus, when k=1, R represents a $C_{4-10}$ alkyl group and specific examples thereof include butyl, pentyl, hexyl, heptyl, octyl, nonyl, and decyl groups. The alkyl group having 4 to 10 carbon atoms can provide an ink having good penetrability. As described above, the alkyl group may be of branched or straight-chain type. In general, however, the branched type is preferred. For example in the case of a butyl group, utilization of a compound with R representing a branched butyl group, that is, an isobutyl or T-butyl group, as a main component can provide an ink having good penetrability which can yield high-quality images. According to the present invention, the compound represented by formula (I) is used as a mixture.

In formula (I), k is a natural number of not less than 1, preferably about 1 to 4. Specifically, as described below, the compound represented by formula (I) is obtained by reacting an alcohol with ethylene oxide or propylene oxide. In this case, when an alcohol containing one OH group is used, k is 1, while when a glycol containing 2 OH group, a triol having 3 OH groups, and a tetraol containing 4 OH groups are used, k values are respectively 2, 3, and 4. There is a possibility that OH groups unreacted with ethylene oxide or propylene oxide are present. According to the present invention, the compounds represented by formula (I) having unreacted OH groups also fall within the scope of the present invention.

R also represents an $Ra$—$CaH_{2a+1-k}$ group. The group may be of branched or straight-chain type. Ra represents a group represented by formula

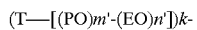

(T—[(PO)$m'$-(EO)$n'$])$k$- wherein

EO, PO, T and k each are as defined above; and n' and m' are respectively n and m. Therefore, EO and PO may be arranged, regardless of order in the parentheses, randomly or as blocks joined together.

In formula (I), R represents group K—M—O— wherein K represents a saturated or unsaturated aromatic ring having 4 to 15 carbon atoms (preferably 4 to 10 carbon atoms) or a saturated or unsaturated aliphatic ring having 4 to 15 carbon atoms (preferably 4 to 10 carbon atoms), M represents a bond or an alkylene group having 1 to 12 carbon atoms, and O represents an oxygen atom. The aromatic ring represented by K contains at least one of nitrogen, oxygen, and sulfur atoms.

Examples of preferred cyclic compounds represented by K include a radical group derived from cycloalkane, cycloalkene, benzene, alkylbenzene, naphthalene, alkylnaphthalene, morpholine, pyridine, pyrazine, pyrimidine, pyridazine, piperazine, piperidine, dioxane, furan, thioxane, pyrroline, pyrazole, pyrazoline, pyrrolidone, pyrrolidine, imidazole, imidazolidine, imidazolidinone, lactam, and lactone rings. Furthermore, preferred examples of cyclic compounds represented by K include $C_{4-10}$ cycloalkyl, $C_{4-10}$ cycloalkenyl, phenyl, and naphthyl.

These cyclic compounds may have at least one substituent, and specific examples of substituents include straight-chain or branched alkyl groups having 1 to 6 carbon atoms, cyclic alkyl groups having 3 to 8 carbon atoms, and aryl groups, such as phenyl, tolyl, and biphenyl groups. According to a preferred embodiment of the present invention, R represents a cyclic saturated aliphatic ring having 4 to 15 carbon atoms, and specific examples thereof include cyclobutyl, cyclopentyl, cyclohexyl, cycloheptyl, cyclooctyl, cyclononanyl, and cyclodecanyl. These rings may have at least one substituent, and specific examples of substituents include straight-chain or branched alkyl groups having 1 to 6 carbon atoms, cyclic alkyl groups having 3 to 8 carbon atoms, and aryl groups, such as phenyl, and tolyl groups.

According to a preferred embodiment of the present invention, group K—M—O— has a molecular weight of not more than 200. The molecular weight of not more than 200 can realize ink compositions having a viscosity suitable for ink jet recording. When the nozzle face of the ink jet recording head has been subjected to water repellency-imparting treatment, the ink composition is less likely to wet the nozzle face and consequently can realize good printing without any ink droplet trajectory directionality problem.

According to the present invention, n and m and n' and m' are expressed in terms of average value on data for the mixture of compounds represented by formula (I) contained in the ink. n or n+n' is 1 to 10, and m or m+m' is 0 to 5. When n and m and n' and m' are in the above respective ranges, an ink can be obtained which is less likely to cause foaming, possesses excellent penetration, and can yield images having good quality. According to a preferred embodiment of the present invention, n and m in the mixture of compounds represented by formula (I) satisfy n/m≧0.5.

The molecular weight of the compound represented by formula (I) may be properly determined, an average molecular weight is preferably not more than 2,000, more preferably not more than 1,000, most preferably not more than 500.

According to a first preferred embodiment of the present invention, the compounds, represented by formula (I), constituting the mixture each are such that R represents a $CaH_{2a+2-k}$ group and T represents OH.

According to a second preferred embodiment of the present invention, the compounds, represented by formula (I), constituting the mixture each are such that R represents an Ra—$CaH_{2a+1-k}$ group and T represents OH.

According to a third preferred embodiment of the present invention, the compounds, represented by formula (I), constituting the mixture each are such that R represents a $CaH_{2a+2-k}$ group and T represents $SO_3M$.

According to a fourth preferred embodiment of the present invention, the compounds, represented by formula (I), constituting the mixture each are such that R represents a $CaH_{2a+2-k}$ group, EO represents —$CH_2CH_2O$—, PO represents —$CH(CH_3)$—$CH_2O$—, and T represents OH, R, EO, PO, and T being attached to one another in that order to represent formula R—(EO)n-(PO)m-T.

According to a fifth preferred embodiment of the present invention, the mixture of compounds represented by formula (I) is composed of:

a compound represented by formula (I) wherein R represents a $CaH_{2a+2-k}$ group and T represents OH, R, EO, PO, and T being attached to one another in that order to represent formula R—(EO)n-(PO)m-T; and a compound represented by formula (I) wherein R represents a $CaH_{2a+2-k}$ group and T represents OH, R, EO, PO, and T being attached to one another in that order to represent formula R—(PO)m-(EO)n-T.

According to another preferred embodiment of the present invention, the compounds, represented by formula (I), composed of the mixture each are such that R represents the group K—M—O— and T represents OH.

The compound represented by formula (I) may be prepared by adding ethylene oxide or propylene oxide in a target molar amount to an alcohol having a corresponding structure as a starting compound in an atmosphere of an alkali or the like. A mixture of two or more compounds represented by formula (I) is generally obtained by the above method.

In the production of the compound represented by formula, preferably, the alcohol used does not remain unreacted, and, even though a part of the alcohol remains unreacted, the amount of the unreacted alcohol is preferably not more than 1% by weight. This is because when the amount of the unreacted alcohol is not more than 1% by weight, problems do not occur such as wetting of the nozzle face of the head to deteriorate print quality and occurrence of an odor of alcohol.

(Di)Propylene Glycol Monobutyl Ether

According to a preferred embodiment of the present invention, the ink comprises (di)propylene glycol monobutyl ether. Incorporation of (di)propylene glycol monobutyl ether can provide inks having higher penetration. The amount of (di)propylene glycol monobutyl ether added may be properly determined in such an amount range as will provide the effect of improving the peneratration. The amount is, however, preferably about 0 to 10% by weight, more preferably 0.5 to 5% by weight.

According to a further preferred embodiment of the present invention, the weight ratio of the compound represented by formula (I) to the (di)propylene glycol monobutyl ether is in the range of 1:0 to 1:10.

Acetylene Glycol Surfactant

According to a preferred embodiment of the present invention, the ink according to the present invention contains an acetylene glycol surfactant. The addition of the acetylene glycol surfactant can provide inks which can realize images having good print quality. The amount of the acetylene glycol surfactant added may be properly determined. The amount, however, is preferably not more than about 5% by weight, more preferably about 0.1 to 2% by weight.

According to a further preferred embodiment of the present invention, the weight ratio of the compound resented by formula (I) to the acetylene glycol surfactant is in the range of 1:0 to 1:3.

Commercially available acetylene glycol surfactants may also be used, and examples thereof include Surfynol 465, TG, and 104 (manufactured by Air Products and Chemicals) and modification products thereof.

Di(tri)ethylene Glycol Monobutyl Ether

According to a preferred embodiment of the present invention, the ink contains di(tri)ethylene glycol monobutyl ether. The addition of di(tri)ethylene glycol monobutyl ether can provide inks which can realize images having better print quality. The amount of di(tri)ethylene glycol monobutyl ether added may be properly determined. The amount, however, is preferably not more than about 20% by weight.

According to a further preferred embodiment of the present invention, the weight ratio of the compound resented by formula (I) to di(tri)ethylene glycol monobutyl ether is in the range of 1:0 to 1:10.

Colorant

The colorant contained in the ink according to the present invention may be either a dye or a pigment.

Dyes usable herein include various dyes commonly used in ink jet recording, such as direct dyes, acid dyes, foodstuff dyes, basic dyes, reactive dyes, disperse dyes, vat dyes, soluble vat dyes, and reactive disperse dyes.

Regarding the pigment, inorganic and organic pigments are usable without any particular limitation. Examples of inorganic pigments usable herein include, in addition to titanium oxide and iron oxide, carbon blacks produced by known processes, such as contact, furnace, and thermal processes. Examples of organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to the present invention, preferred pigments are dispersible and/or soluble in water without a dispersant. These pigments are those which have been surface treated so that at least one functional group, selected from carbonyl, carboxyl, hydroxyl, and sulfone groups, or a salt thereof is bonded to the surface of the pigment, thereby permitting the pigments to be dispersible and/or soluble in water without a dispersant. Specifically, these pigments can be prepared by grafting a functional group or a molecule containing a functional group onto the surface of carbon black by physical treatment, such as vacuum plasma, or chemical treatment. In the present invention, a single type or a plurality of types of functional groups may be grafted onto one carbon black particle. The type of the functional group to be grafted and the degree of grafting may be suitably determined by taking the dispersion stability in the ink, the color density, the drying property at the front face of the ink jet head and the like into consideration.

In the present invention, when the pigment is stably present in water without any dispersant, this state is expressed as the state of "dispersion and/or dissolution." Not infrequently, it is difficult to distinguish the state of dissolution of a material from the state of dispersion of the material. In the present invention, any pigment can be used so far as the pigment is stably present in water without any dispersant independently of whether the pigment is in a dispersion form or a solution form. In the present specification, a pigment, which can stably exist in water without any dispersant is often referred to as a "water-soluble pigment." The water-soluble pigment in this case, however, does not exclude a pigment which is in the state of dispersion in water.

According to a preferred embodiment of the present invention, the pigment is used as a pigment dispersion having an average particle diameter of 50 to 200 nm and a degree of dispersion of not more than 10.

The pigment, which is preferably used in the present invention, may be prepared, for example, by a method disclosed in Japanese Patent Laid-Open No. 3498/1996. Further, the above pigment may be a commercially available one, and preferred examples thereof include Microjet CW1 manufactured by Orient Chemical Industries, Ltd.

The amount of the pigment added to the ink is preferably 3 to 30% by weight, more preferably about 5 to 17% by weight.

Water-Soluble Organic Solvent

Examples of the water-soluble organic solvent contained in the ink according to the present invention include: alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, and dipropylene glycol mono-n-butyl ether; formamide; acetamide; dimethyl sulfoxide; sorbit; sorbitan; acetin; diacetin; triacetin; and sulfolane.

The amount of the water-soluble organic solvent added to the ink is preferably 1 to 30% by weight, more preferably about 3 to 15% by weight.

Water and Other Additives

According to the ink of the present invention, water is a main solvent. Water may be pure water obtained by ion exchange, ultrafiltration, reverse osmosis, distillation or the like, or ultrapure water. Further, water, which has been sterilized by ultraviolet irradiation or by addition of hydrogen peroxide, is suitable because, when the ink is stored for a long period of time, it can prevent the growth of mold or bacteria.

According to a preferred embodiment of the present invention, a water-soluble glycol is added to the ink. Examples of preferred water-soluble glycols include ethylene glycol, diethylene glycol, triethylene glycol, propylene glycol, dipropylene glycol, tripropylene glycol, polyethylene glycol having a molecular weight of not more than 2000, 1,3-propylene glycol, isopropylene glycol, isobutylene glycol, 1,4-butanediol, 1,3-butanediol, 1,5-pentanediol, 1,6-hexanediol, glycerin, mesoerythritol, and pentaerythritol. Water-soluble glycols function to prevent the ink from drying in the front face of nozzles.

The amount of the glycol added to the ink is preferably 1 to 30% by weight, more preferably about 3 to 15% by weight.

According to a preferred embodiment of the present invention, various saccharides may also be used in the ink. Preferred saccharides usable herein include monosaccharides and polysaccharides. More specific examples thereof include glucose, mannose, fructose, ribose, xylose, arabinose, lactose, galactose, aldonic acid, glucitose, maltose, cellobiose, sucrose, trehalose, maltotriose, alginic acid and salts thereof, cyclodextrins, and celluloses. The amount of the saccharide added to the ink is preferably about 0.05 to 30% by weight.

The addition of the saccharide can prevent a clogging phenomenon where the ink dries at the front end of the head and consequently clogs the head. In this connection, the amount of conventional saccharides, i.e., monosaccharides and polysaccharides, added to the ink is preferably about 3 to 20%. On the other hand, the amount of alginic acid and salts thereof, cyclodextrins, and celluloses added to the ink is preferably such that the low viscosity of the ink can be maintained permitting proper printing.

According to a preferred embodiment of the present invention, the ink may further comprise a surfactant. Preferred surfactants which may be added to the ink are those having good compatibility with other ingredients of the ink, and, among the surfactants, those having high penetrability and good stability are preferred. Preferred examples thereof include amphoteric surfactants and nonionic surfactants. Examples of amphoteric surfactants usable herein include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, and imidazoline derivatives. Examples of nonionic surfactants usable herein include ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether, polyoxyethyleneoleic acid, ester surfactants, such as polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate, and fluorosurfactants, such as fluoroalkyl esters and salts of perfluoroalkylcarboxylic acids. It is also possible to use acethylene glycol surfactants, and examples of acethylene glycol surfactants usable herein include Surfynol 465, TG, and 104 (manufactured by Air Products and Chemicals) and modification products thereof. Addition of the surfactant permits the penetrability of the ink to be further efficiently regulated. Further, this can offer an additional advantage that the water solubility of the compounds represented by the formulae. (I) can be improved.

The amount of the surfactant added to the ink is preferably 0.01 to 5% by weight, more preferably about 0.1 to 3% by weight.

According to a preferred embodiment of the present invention, when the colorant is a pigment, the ink may further comprise an emulsion. Addition of the emulsion can improve the fixation and rubbing/scratch resistance of the resultant print. Preferably, the emulsion comprises a continuous phase of water and a dispersed phase of acrylic resin, methacrylic resin, styrene resin, urethane resin, acrylamide resin, or epoxy resin or a mixture of these resins. Particularly preferred is an emulsion wherein the dispersed phase comprises a resin composed mainly of acrylic acid and/or methacrylic acid. The resin is not limited by copolymerization methods and may be, for example, a block copolymer, a random copolymer or the like. Further, preferably, the emulsion used in the ink of the present invention has a film forming property and has a lowest possible film forming temperature of preferably room temperature or below, more preferably 0 to 20° C.

According to a preferred embodiment of the present invention, the resin component of the emulsion is a resin particle having a core/shell structure comprising a core surrounded by a shell. For example, the resin particle may be constructed so that a resin component capable of improving the drying to the touch and the fixation of the ink is incorporated into the core and a resin component, which permits resin particles to stably exist in the ink, is incorporated into the shell. According to a preferred embodiment of the present invention, the shell comprises a resin having either a crosslinked structure or a structure with the number of benzene nuclei being larger than that in the structure of the core.

Materials for the shell usable herein include styrene, tetrahydrofurfuryl acrylate and butyl methacrylate, ($\alpha$, 2, 3, or 4)-alkylstyrene, ($\alpha$, 2, 3, or 4)-alkoxystyrene, 3,4-dimethylstyrene, $\alpha$-phenhylstyrene, divinylbenzene, vinylnaphthalene, dimethylamino (meth)acrylate, dimethylaminoethyl (meth)acrylate, dimethylaminopropylacrylamide, N,N-dimethylaminoethyl acrylate, acryloylmorpholine, N,N-dimethylacrylamide, N-isopropylacrylamide, N,N-diethylacrylamide, methyl (meth)acrylate, ethyl (meth)acrylate, propyl (meth)acrylate, ethylhexyl (meth)acrylate, and other alkyl (meth)acrylates, methoxydiethylene glycol (meth)acrylate, (meth)acrylate of an ethyl, propyl, or butyl ester of diethylene glycol or polyethylene glycol, cyclohexyl (meth)acrylate, benzyl (meth)acrylate, phenoxyethyl (meth)acrylate, isobornyl (meth)acrylate, hydroxyalkyl (meth)acrylate, fluorine-, chlorine-, or silicon-containing (meth)acrylate, (meth) acrylamide, and maleic amide.

When a crosslinked structure is introduced in addition to the above (meth)acrylic acid, it is possible to use (mono, di, tri, tetra, or poly)ethylene glycol di(meth)acrylate, (meth) acrylates of 1,4-butanediol, 1,5-pentanediol, 1,6-hexanediol, 1,8-octanediol, and 1,10-decanediol, trimethylolpropane tri (meth)acrylate, glycerin (di or tri)(meth)acrylate, di(meth) acrylate of ethylene oxide adduct of bisphenol A or F, neopentyl glycol di(meth)acrylate, pentaerythritol tetra (meth) acrylate, and dipentaerythritol hexa(meth)acrylate.

For the formation of the core, the same material as used in the formation of the shell may be used.

Emulsifiers usable for the formation of the above polymeric fine particles include sodium laurylsulfate, potassium laurylsulfate, anionic surfactants, nonionic surfactants, and amphoteric surfactants, which are commonly used in the art.

Polymerization initiators usable herein include potassium persulfate, ammonium persulfate, hydrogen persulfate, azobisisobutyronitrile, benzoyl peroxide, dibutyl peroxide, peracetic acid, cumene hydroperoxide, t-butyl hydroxyperoxide, and p-menthane hydroperoxide.

Chain transfer agents usable for the polymerization include t-dodecylmercaptan, n-dodecylmercaptan, n-octylmercaptan, xanthogen compound, such as dimethylxanthogendisulfide or diisobutylxanthogendisulfide, dipentene, indene, 1,4-cyclohexadiene, dihydrofuran, and xanthen.

According to a preferred embodiment of the present invention, the molecular weight of the emulsion is preferably not less than 1000, more preferably about 10,000 to 100,000.

The emulsion used in the present invention may be a commercially available one, and examples thereof include Z116 manufactured by Mitsui Toatsu Chemicals, Inc.

The amount of the emulsion added may be properly determined. For example, it is preferably about 0.5 to 10% by weight, more preferably about 3 to 5% by weight.

The ink of the present invention may contain, in addition to the above ingredients, other ingredients. Examples of other ingredients usable herein include preservatives, antioxidants, ultraviolet absorbers, electric conductivity adjustors, pH adjustors, viscosity modifiers, surface tension modifiers, oxygen absorbers, and nozzle clogging preventives.

For example, sodium benzoate, pentachlorophenol sodium, 2-pyridinethiol-1-oxide sodium, sodium sorbate, sodium dehydroacetate, and 1,2-dibenzothiazoline-3-one (Proxel CRL, Proxel BDN, Proxel GXL, Proxel XL-2, and Proxel TN, manufactured by ICI) may be used as preservatives or antimold in the ink of the present invention.

Compounds usable as pH adjustors, solubilizers, or antioxidants in the ink include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanate compounds, such as allophanate and methyl allophanate; biuret compounds, such as biuret, dimethylbiuret, and tetramethylbiuret; and L-ascorbic acid and salts thereof.

Examples of antioxidants and ultraviolet absorbers include Tinuvin 328, 900, 1130, 384, 292, 123, 144, 622, 770, and 292, Irgacor 252 and 153, and Irganox 1010, 1076, 1035, and MD1024, manufactured by Ciba-Geigy, and lanthanide oxides.

Viscosity modifiers usable herein include rosin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic, and starch.

Ink Jet Recording Method and Apparatus

The ink jet recording method used with the ink according to the present invention refers to a recording method wherein a droplet of an ink is ejected and deposited onto a recording medium to perform printing. Examples of such ink jet recording methods include, for example, a method wherein an electric signal is converted to a mechanical signal using an electrostrictive element to intermittently eject an ink reservoired in a nozzle head section, thereby recording letters or symbols on the surface of a recording medium, and a method wherein an ink, reservoired in a nozzle head section, in its portion very close to the ejection portion is rapidly heated to create a bubble and the ink is intermittently ejected by volume expansion created by the bubble to record letters or symbols on the surface of a recording medium. According to a preferred embodiment of the present invention, the ink of the present invention is used in ink jet recording using an electrostrictive element. This is because methods involving heating of the head section are likely to cause the colorant and other ingredients contained in the ink to be decomposed, clogging the head.

An ink, which may contain a pigment as the colorant, having a relatively high content of a solid, like the ink of the present invention, when placed in a nozzle without ejection for a long period of time, is likely to dry at the front face of the nozzle to cause thickening, leading to an ink droplet trajectory directionality problem. In this case, slightly moving the ink with care not to cause the ink to be delivered from the front face of the nozzle can stir the ink, permitting the ink to be stably ejected. This can be achieved by pressurizing the ink, by means of pressurizing means for ejecting the ink, with care not to cause the ink to be ejected. In the above regulation, use of an electrostrictive element as the pressurizing means is preferred from the viewpoint of easy regulation. Utilization of this mechanism can increase the content of the pigment in the ink, permitting a high color density to be provided using a pigment-based ink and, in addition, the ink to be stably ejected.

When the above slight moving of the ink is carried out in the nozzle face of an ink jet recording apparatus, this operation is effective for an ink having a pigment content of about 5 to 15% by weight, more preferably about 7 to 10% by weight.

In use, the ink of the present invention may be filled into an ink tank constructed so that a polyurethane foam is provided therein and the ink comes into contact with the polyurethane foam. In this case, the glycol ether compound, which is preferably used in the present invention, and the acetylene glycol surfactant used in the present invention are adsorbed onto the polyurethane foam. Therefore, preferably, they are added in an excessive amount in consideration of the adsorption. Further, the polyurethane foam can ensure a negative pressure by using the ink of the present invention and is less likely to be decomposed by ingredients of the ink used in the present invention, or to create a deposit causative of clogging of the nozzle. A polyurethane foam not using a curing catalyst containing a metal salt or a cationic material is preferred. Specifically, use of a polyurethane foam comprising a polyfunctional isocyanate, such as tolylene diisocyanate or m-xylene diisocyanate, and a material having a plurality of hydroxyl groups, such as a glycol compound having an average molecular weight of about 300 to 3000, such as polypropylene glycol or polyethylene glycol, glycerin, pentaerythritol, dipentaerythritol, neopentyl glycol, propylene glycol, 1,3-butanediol, 1,4-butanediol, or 1,5-pentanediol, is preferred from the viewpoint of ensuring negative pressure, by virtue of the stability of foam shape, and chemical stability.

When the acetylene glycol surfactant is utilized, a part of the acetylene glycol surfactant is adsorbed onto the polyurethane foam. Therefore, when the acetylene glycol surfactant is added to the ink, the composition of the ink should be determined by taking into consideration the amount of the acetylene glycol surfactant adsorbed onto the urethane foam.

According to a preferred embodiment of the present invention, the ink of the present invention is printed by ejecting a droplet of the ink through a nozzle the front end (head) of which has a water-repellent surface. More specifically, the front end of the nozzle preferably has a structure produced by providing a stainless steel material as a base material, applying a eutectoid plating of tetrafluoroethylene and nickel on the base, and heat-treating the plating to form a water-repellent layer. In addition, utilization of a eutectoid plating of tetrafluoroethylene and a highly non-oxidizable metal, such as chromium, titanium, gold, platinum, silver, or iridium, instead of nickel is also preferred. A combination of the ink according to the present invention with the above nozzle enables continuous printing to be stably performed for a long period of time.

According to a more preferred embodiment of the present invention, the contact angle of the ink on the water-repellent surface at the front end of the nozzle is 50 degrees or above at a general operation temperature of the printer (for example, 15 to 60° C.). According to this embodiment, improved print quality and continuous printing can be realized.

EXAMPLES

The present invention will be described in more detail with reference to the following examples, though it is not limited to these examples only.

In the following description, the following abbreviations are used.

DEGmBE: diethylene glycol mono-n-butyl ether
DMI: 1,3-dimethy-2-imidazolidinone
PGmBE: propylene glycol mono-n-butyl ether
MPD: 2-methyl-2,4-pentanediol
DPGmBE: dipropylene glycol mono-n-butyl ether
TEGmBE: triethylene glycol mono-n-butyl ether In the following description, n, m, n', and m' each are the average value on a weight basis of the compound represented by formula (I) present in the system.

Preparation of Polymeric Fine Particles

Polymeric fine particles A to D used in the following examples were prepared as follows.

Polymeric Fine Particle A

Ion-exchanged water (100 parts) was placed in a reactor equipped with a dropping device, a thermometer, a water cooling type reflux condenser, and a stirrer. Potassium persulfate as a polymerization initiator (0.2 part) was added to the system with stirring in a nitrogen atmosphere at 70° C. A monomer solution was prepared by adding 0.05 part of sodium laurylsulfate, 5 parts of styrene, 6 parts of tetrahydrofurfuryl acrylate, 5 parts of butyl methacrylate, and 0.02 part of t-dodecylmercaptan to 7 parts, of ion-exchanged water. This monomer solution was added dropwise to the reactor at 70° C. to perform a reaction. Thus a primary compound was prepared. A 10% ammonium persulfate solution (2 parts) was added to the primary compound. The mixture was stirred. A reaction solution composed of 30 parts of ion-exchanged water, 0.2 part of potassium laurylsulfate, 30 parts of styrene, 15 parts of butyl methacrylate, 16 parts of butyl acrylate, 2 parts of acrylic acid, 1 part of 1,6-Hexanediol dimethacrylate, and 0.5 part of t-dodecylmercaptan was added to the mixture at 70° C. with stirring to perform a polymerization reaction. Thereafter, the system was neutralized with ammonia and adjusted to pH 8 to 8.5, followed by filtration through a 0.3 µm filter to obtain polymeric fine particle A as an emulsion.

Polymeric Fine Particle B

Ion-exchanged water (100 parts) was placed in a reactor equipped with a dropping device, a thermometer, a water cooling type reflux condenser, and a stirrer. Potassium persulfate as a polymerization initiator (0.2 part) was added to the system with stirring in a nitrogen atmosphere at 70° C. A monomer solution was prepared by adding 0.05 part of sodium laurylsulfate, 10 parts of styrene, 10 parts of butyl methacrylate, and 0.02 part of t-dodecylmercaptan to 7 parts of ion-exchanged water. This monomer solution was added dropwise to the reactor at 70° C. to perform a reaction. Thus a primary compound was prepared. A 10% ammonium persulfate solution (2 parts) was added to the primary compound. The mixture was stirred. A reaction solution composed of 30 parts of ion-exchanged water, 0.2 part of potassium laurylsulfate, 35 parts of styrene, 25 parts of butyl methacrylate, 10 parts of acrylic acid, 1 part of bisphenol A dimethacrylate, and 0.5 part of t-dodecylmercaptan was added to the mixture at 70° C. with stirring to perform a polymerization reaction. Thereafter, the system was neutralized with ammonia and adjusted to pH 8 to 8.5, followed by filtration through a 0.3 µm filter to obtain polymeric fine particle B as an emulsion.

Polymeric Fine Particle C

Ion-exchanged water (100 parts) was placed in a reactor equipped with a dropping device, a thermometer, a water cooling type reflux condenser, and a stirrer. Potassium persulfate as a polymerization initiator (0.2 part) was added to the system with stirring in a nitrogen atmosphere at 70° C. A monomer solution was prepared by adding 0.05 part of sodium laurylsulfate, 15 parts of styrene, 6 parts of benzyl methacrylate, 10 parts of butyl methacrylate, and 0.02 part of t-dodecylmercaptan to 7 parts of ion-exchanged water. This monomer solution was added dropwise to the reactor at 70° C. to perform a reaction. Thus a primary compound was prepared. A 10% ammonium persulfate solution (2 parts) was added to the primary compound. The mixture was stirred. A reaction solution composed of 30 parts of ion-exchanged water, 0.2 part of potassium laurylsulfate, 30 parts of styrene, 15 parts of butyl methacrylate, 10 parts of acrylic acid, 1 part of triethanolpropane trimethacrylate, 1 part of 1,6-hexanediol dimethacrylate, and 0.5 part of t-dodecylmercaptan was added to the mixture at 70° C. with stirring to perform a polymerization reaction. Thereafter, the system was neutralized with ammonia and adjusted to pH 8 to 8.5, followed by filtration through a 0.3 µm filter to obtain polymeric fine particle C as an emulsion.

Polymeric Fine Particle D

Ion-exchanged water (100 parts) was placed in a reactor equipped with a dropping device, a thermometer, a water cooling type reflux condenser, and a stirrer. Potassium persulfate as a polymerization initiator (0.2 part) was added to the system with stirring in a nitrogen atmosphere at 70° C. A monomer solution was prepared by adding 0.05 part of sodium laurylsulfate, 15 parts of styrene, 15 parts of butyl methacrylate, and 0.02 part of t-dodecylmercaptan to 7 parts of ion-exchanged water. This monomer solution was added dropwise to the reactor at 70° C. to perform a reaction. Thus a primary compound was prepared. A 10% ammonium persulfate solution (2 parts) was added to the primary compound. The mixture was stirred. A reaction solution composed of 30 parts of ion-exchanged water, 0.2 part of potassium laurylsulfate, 30 parts of styrene, 15 parts of butyl methacrylate, 1 part of dipentaerythritol hexamethacrylate, and 0.6 part of t-dodecylmercaptan was added to the mixture at 70° C. with stirring to perform a polymerization reaction. Thereafter, the system was neutralized with ammonia and adjusted to pH 8 to 8.5, followed by filtration through a 0.3 µm filter to obtain polymeric fine particle D as an emulsion.

Example A

Preparation of Inks

In the following examples, water-soluble pigments 1 to 4 are water-soluble pigments prepared by oxidizing the surface of carbon black having a particle diameter of 10 to 300 nm to introduce a carbonyl-terminated group, a carboxyl-terminated group, a hydroxyl-terminated group and/or a sulfone-terminated group into the surface of the carbon black. The average particle diameter of the water-soluble pigments was as indicated in parentheses (unit: nm).

The compounds of formula (I) used in Example A were compounds wherein T represents a hydrogen atom.

In the following description, water-soluble dye 1 is Direct Black 154, water soluble dye 2 Direct Yellow 132, water-soluble dye 3 Direct Blue 86, and water-soluble dye 4 Acid Red 52.

Into all the inks described below were added 0.1 to 1% by weight of Proxel XL-2 as a corrosion preventive for inks and 0.001 to 0.05% by weight of benzotriazole as a corrosion preventive for an ink jet head member.)

| Example A1 | Amount added (wt %) |
| --- | --- |
| Water-soluble pigment 1 (105) | 5.0 |
| Compound A1 of formula (I) | 8.0 |
| DEGmBE | 2.0 |
| Polymeric fine particle A | 3.0 |
| Glycerin | 6.0 |
| 1,5-Pentanediol | 5.0 |
| Triethanolamine | 0.8 |
| Ion-exchanged water | Balance |

Compound A1 of formula (I) is a compound of formula (I) wherein R represents a neopentyl group, n is 3, and m is 1.5.

| Example A2 | |
| --- | --- |
| Water-soluble pigment 2 (85) | 4.5 |
| Compound A2 of formula (I) | 10.0 |
| Polymeric fine particle A | 3.0 |
| Dipropylene glycol | 5.0 |
| Surfynol 465 | 1.2 |
| Triethanolamine | 0.9 |
| Ion-exchanged water | Balance |

Compound A2 of formula (I) is a compound of formula (I) wherein R represents a t-butyl group, n is 3, and m is 1.3.

| Example A3 | |
| --- | --- |
| Water-soluble pigment 3 (90) | 5.5 |
| Compound A3 of formula (I) | 10.0 |
| Polymeric fine particle B | 10.0 |
| Diethylene glycol | 7.0 |
| Thiodiglycol | 3.5 |
| 1,6-Hexanediol | 5.0 |
| Triethanolamine | 1.0 |
| Potassium hydroxide | 0.1 |
| Ion-exchanged water | Balance |

Compound A3 of formula (I) is a compound of formula (I) wherein R represents a 1,3-dimethylbutyl group, n is 3, and m is 1.5.

| Example A4 | |
| --- | --- |
| Water-soluble pigment 4 (80) | 5.0 |
| Water-soluble dye 1 | 1.0 |
| Compound A4 of formula (I) | 8.0 |
| TEGmBE | 3.0 |
| Polymeric fine particle C | 1.0 |
| Diethylene glycol | 3.0 |
| 1,5-Pentanediol | 2.0 |
| Dimethyl-2-imidazolidinone | 2.0 |

-continued

| Example A4 | |
|---|---|
| Sodium benzoate | 0.1 |
| Triethanolamine | 0.7 |
| Ion-exchanged water | Balance |

Compound A4 of formula (I) is a compound of formula (I) wherein R represents an isobutyl group, n is 3, and m is 0.5.

| Example A5 | |
|---|---|
| Water-soluble pigment 1 (105) | 3.0 |
| Water-soluble dye 1 | 1.0 |
| Compound A5 of formula (I) | 7.0 |
| DEGmBE | 2.0 |
| Polymeric fine particle D | 1.0 |
| Glycerin | 14.0 |
| Triethanolamine | 0.9 |
| Ion-exchanged water | Balance |

Compound A5 of formula (I) is a mixture of 50% by weight of a compound of formula (I), wherein R represents an n-hexyl group, n is 4, and m is 2, with 50% by weight of a compound of formula (I), wherein R represents a 2-ethylhexyl group, n is 4, and m is 0.

| Example A6 | |
|---|---|
| Water-soluble dye 2 | 5.0 |
| Compound A6 of formula (I) | 6.0 |
| TEGmBE | 4.0 |
| Glycerin | 15.0 |
| Thiodiglycol | 2.0 |
| 1,5-Pentanediol | 1.0 |
| Triethanolamine | 0.9 |
| Ion-exchanged water | Balance |

Compound A6 of formula (I) is a compound of formula (I) wherein R represents a 1,1-dimethylbutyl group, n is 4, and m is 1.

| Example A7 | |
|---|---|
| Water-soluble dye 3 | 5.0 |
| Compound A7 of formula (I) | 10.0 |
| DEGmBE | 3.0 |
| Glycerin | 5.0 |
| Trimethylolpropane | 1.0 |
| Trimethylolethane | 1.0 |
| Surfynol 465 | 1.0 |
| Triethanolamine | 0.5 |
| KOH | 0.05 |
| Ion-exchanged water | Balance |

Compound A7 of formula (I) is a mixture of 50% by weight of a compound of formula (I), wherein R represents a 1,3-dimethylbutyl group, n is 3, and m is 1, with 50% by weight of a compound of formula (I) wherein R represents a n-heptyl group, n is 3.5, and m is 1.

| Example A8 | |
|---|---|
| Water-soluble dye 4 | 5.5 |
| Compound A8 of formula (I) | 6.0 |
| Glycerin | 5.0 |
| Diethylene glycol | 5.0 |
| Tetrapropylene glycol | 5.0 |
| Triethanolamine | 0.9 |
| KOH | 0.1 |
| Ion-exchanged water | Balance |

Compound A8 of formula (I) is a mixture of 50% by weight of a compound of formula (I) wherein R represents a neopentyl group, n is 1.0, and m is 0.3, with 30% by weight of a compound of formula (I) wherein R represents an n-pentyl group, n is 2.5, and m is 1.0, and 20% by weight of a compound of formula (I) wherein R represents an isopentyl group, n is 3.0, and m is 1.5.

Comparative Example A

In the following comparative examples, the term "water-soluble pigments" refers to a carbon black which has been dispersed with the aid of a styrene/acrylic random copolymer as a dispersant, and the average particle diameter thereof was as indicated in the parentheses (unit: nm).

| Comparative Example 1 | |
|---|---|
| Water-soluble pigment 9 (90) | 5.0 |
| Glycerin | 10.0 |
| Dispersant | 3.0 |
| Nonionic surfactant | 1.0 |
| Ion-exchanged water | Balance |
| Comparative Example 2 | |
| Water-soluble dye (Food Black 2) | 5.5 |
| DEGmME | 7.0 |
| Diethylene glycol | 10.0 |
| 2-Pyrrolidone | 5.0 |
| Ion-exchanged water | Balance |
| Comparative Example 3 | |
| Water-soluble pigment 11 (110) | 5.5 |
| Water-soluble dye (Food Black 2) | 2.5 |
| Diethylene glycol | 10.0 |
| Nonionic surfactant | 1.0 |
| Ion-exchanged water | Balance |

Print Evaluation Test

Characters were printed using the inks prepared in Examples A1 to A8 and Comparative Examples A1 to A3 by means of an ink jet printer MJ-930C (manufactured by Seiko Epson Corp.). Papers used for the evaluation were Conqueror, Favorit, Modo Copy, Rapid Copy, EPSON EPP, Xerox 4024, Xerox 10, Neenha Bond, Ricopy 6200, Yamayuri, and Xerox R papers that are plain papers commercially available in Europe, America, and Japan.

The prints thus obtained were evaluated for feathering according to the following criteria.

Assuming that 10 to 50 mg of a spherical ink droplet was spread in a circular form on the surface of paper, the radius of an circumscribed circle, r2, to the radius of an inscribed circle, r1, that is, r2/r1, in the formed ink dot was determined. The results were evaluated according to the following criteria.

A: $r2/r1 \leq 2.0$
B: $2.0 < r2/r1 \leq 4.0$

C: $4.0 < r2/r1 \leq 6.0$

D: $6.0 < r2/r1$

The results of evaluation were as summarized in the following table.

|  | Example A | | | | | | | | Comparative Example A | | |
|---|---|---|---|---|---|---|---|---|---|---|---|
|  | 1 | 2 | 3 | 4 | 5 | 6 | 7 | 8 | 1 | 2 | 3 |
| Conqueror | A | A | A | A | A | A | A | A | C | C | D |
| Favorit | A | A | A | A | A | A | A | A | D | D | D |
| Modo Copy | A | A | A | A | A | A | A | A | C | D | D |
| Rapid Copy | A | A | A | A | A | A | A | A | C | D | D |
| EPSON EPP | A | A | A | A | A | A | A | A | C | C | D |
| Xerox P | A | A | A | A | A | A | A | A | C | D | D |
| Xerox 4024 | A | A | A | A | A | A | A | A | C | D | D |
| Xerox 10 | A | A | A | A | A | A | A | A | B | D | D |
| Neenha Bond | A | A | A | A | A | A | A | A | C | D | D |
| Ricopy 6200 | A | A | A | A | A | A | A | A | B | C | D |
| Yamayuri | A | A | A | A | A | A | A | A | D | D | D |
| Xerox R | A | A | A | A | A | A | A | A | C | D | D |

Example B

In the following examples, water-soluble pigments 1 to 4 are water-soluble pigments prepared by oxidizing the surface of carbon black having a particle diameter of 10 to 300 nm to introduce a carbonyl-terminated group, a carboxyl-terminated group, a hydroxyl-terminated group and/or a sulfone-terminated group into the surface of the carbon black. The average particle diameter of the water-soluble pigments was as indicated in parentheses (unit: nm).

The compounds of formula (I) used in Example B were compounds wherein T represents OH.

In the following description, water-soluble dye 1 is Direct Black 154, water-soluble dye 2 Direct Yellow 132, water-soluble dye 3 Direct Blue 86, and water-soluble dye 4 Acid Red 52.

Into all the inks described below were added 0.1 to 1% by weight of Proxel XL-2 as a corrosion preventive for inks and 0.001 to 0.05% by weight of benzotriazole as a corrosion preventive for an ink jet head member.

| Example B1 | Amount added (wt %) |
|---|---|
| Water-soluble pigment 1 (105) | 5.0 |
| Compound B1 of formula (I) | 8.0 |
| DEGmBE | 2.0 |
| Polymeric fine particle A | 3.0 |
| Diethylene glycol | 16.0 |
| 2-Pyrrolidone | 5.0 |
| Triethanolamine | 0.8 |
| Ion-exchanged water | Balance |

The compound B1 of formula (I) is a compound of formula (I) wherein R represents an Ra-neopentyl group (Ra-(2,2-dimethyl)propylene group), n+n' is 3, and m+m' is 1.5.

| Example B2 | |
|---|---|
| Water-soluble pigment 2 (85) | 4.5 |
| Compound B2 of formula (I) | 10.0 |

| Example B2 (continued) | |
|---|---|
| Polymeric fine particle A | 3.0 |
| Dipropylene glycol | 5.0 |
| Surfynol 465 | 1.2 |
| Triethanolamine | 0.9 |
| Ion-exchanged water | Balance |

The compound B2 of formula (I) is a compound of formula (I) wherein R represents an Ra-t-butyl group (Ra-(1,1-dimethyl)ethylene group), n+n' is 3, and m+m' is 1.3.

Example B3

| | |
|---|---|
| Water-soluble pigment 3 (90) | 5.5 |
| Compound B3 of formula (I) | 2.0 |
| Polymeric fine particle B | 10.0 |
| Diethylene glycol | 7.0 |
| Thiodiglycol | 3.5 |
| 1,6-Hexanediol | 5.0 |
| Triethanolamine | 1.0 |
| Potassium hydroxide | 0.1 |
| Ion-exchanged water | Balance |

The compound B3 of formula (I) is a compound of formula (I) where R represents an Ra-1,3-dimethylbutyl group (Ra-(1,3-dimethyl)butylene group), n+n' is 3, and m+m' is 1.5.

Example B4

| | |
|---|---|
| Water-soluble pigment 4 (80) | 5.0 |
| Water-soluble dye 1 | 1.0 |
| Compound B4 of formula (I) | 8.0 |
| TEGmBE | 3.0 |
| Polymeric fine particle C | 1.0 |
| Diethylene glycol | 3.0 |
| 1,5-Pentanediol | 2.0 |
| Dimethyl-2-imidazolidinone | 2.0 |
| Sodium benzoate | 0.1 |
| Triethanolamine | 0.7 |
| Ion-exchanged water | Balance |

The Compound B4 of formula (I) is a compound of formula (I) wherein R represents an Ra-isobutyl group (a 1-methylpropenyl group), n+n' is 3, and m+m' is 0.5.

Example B5

| | |
|---|---|
| Water-soluble pigment 1 (105) | 3.0 |
| Water-soluble dye 1 | 1.0 |
| Compound B5 of formula (I) | 7.0 |
| DEGmBE | 2.0 |
| Polymeric fine particle D | 1.0 |
| Glycerin | 14.0 |
| Triethanolamine | 0.9 |
| Ion-exchanged water | Balance |

The compound B5 of formula (I) is a mixture of 50% by weight of a compound of formula (I), wherein R represents an Ra-n-hexyl group (an Ra-n-hexylene group), n+n' is 4, and m+m' is 2, with 50% by weight of a compound of formula (I) wherein R represents an Ra-2-ethylhexyl group (an Ra-2-ethylhexylene group), n+n' is 4, and m+m' is 0.

Example B6

| | |
|---|---|
| Water-soluble dye 2 | 5.0 |
| Compound B6 of formula (I) | 6.0 |
| TEGmBE | 4.0 |
| Glycerin | 15.0 |
| Thiodiglycol | 2.0 |
| 1,5-pentanediol | 1.0 |
| Triethanolamine | 0.9 |
| Ion-exchanged water | Balance |

The compound B6 of formula (I) is a compound of formula (I) wherein R represents an Ra-1,1-dimethylbutyl group (an Ra-1,1-dimethylbutylene group), n+n' is 4, and m+m' is 1.

Example B7

| | |
|---|---|
| Water-soluble dye 3 | 5.0 |
| Compound B7 of formula (I) | 10.0 |
| DEGmBE | 3.0 |
| Glycerin | 5.0 |
| Trimethylolpropane | 1.0 |
| Trimethylolethane | 1.0 |
| Surfynol 465 | 1.0 |
| Triethanolamine | 0.5 |
| KOH | 0.05 |
| Ion-exchanged water | Balance |

The compound B7 of formula (I) is a mixture of 50% by weight of a compound of formula (I), wherein R represents an Ra-1,3-dimethylbutyl group (an Ra-1,3-dimethylbutyl group), n+n' is 3, and m+m1 is 1, with 50% by weight of a compound of formula (I) wherein R represents an Ra-n-heptyl group (an Ra-n-heptylene group), n+n' is 3.5, and m+m' is 1.

Example B8

| | |
|---|---|
| Water-soluble dye 4 | 5.5 |
| Compound B8 of formula (I) | 6.0 |
| Glycerin | 5.0 |
| Diethylene glycol | 5.0 |
| Tetrapropylene glycol | 5.0 |
| Triethanolamine | 0.9 |
| KOH | 0.1 |
| Ion-exchanged water | Balance |

The compound B8 of formula (I) is a mixture of 50% by weight of a compound of formula (I) wherein R represents an Ra-neopentyl group (an Ra-(2,2-dimethyl)propylene group), n+n' is 1.0, and m+m' is 0.3, with 30% by weight of a compound of formula (I), wherein R represents an Ra-n-pentyl group (an Ra-n-pentylene group), n+n' is 2.5, and m+m' is 1.0, and 20% by weight of a compound of formula (I) wherein R represents an Ra-isopentyl group (an Ra-(1-methyl)butylene group), n+n' is 3.0, and m+m' is 1.5.

Print Evaluation Test

In the same manner as in Examples A1 to A8 and Comparative Examples B1 to B3, the inks of Examples B1 to B8 were subjected to a print evaluation test, and the prints were evaluated for feathering. The results were as summarized in the following table.

| | Example B | | | | | | | |
|---|---|---|---|---|---|---|---|---|
| | 1 | 2 | 3 | 4 | 5 | 6 | 7 | 8 |
| Conqueror | A | A | A | A | A | A | A | A |
| Favorit | A | A | A | A | A | A | A | A |
| Modo Copy | A | A | A | A | A | A | A | A |
| Rapid Copy | A | A | A | A | A | A | A | A |
| EPSON EPP | A | A | A | A | A | A | A | A |
| Xerox P | A | A | A | A | A | A | A | A |
| Xerox 4024 | A | A | A | A | A | A | A | A |
| Xerox 10 | A | A | A | A | A | A | A | A |
| Neenha Bond | A | A | A | A | A | A | A | A |
| Ricopy 6200 | A | A | A | A | A | A | A | A |
| Yamayuri | A | A | A | A | A | A | A | A |
| Xerox R | A | A | A | A | A | A | A | A |

Example C

Pigments 1 to 4 below were used in the following examples.

Pigment 1

A styrene/acrylic acid copolymer (weight average molecular weight 25000, acid value 200) (4 parts), 2.7 parts of triethanolamine, 0.4 part of isopropyl alcohol, and 72.9 parts of ion-exchanged water were completely dissolved in one another with heating at 70° C. Carbon black MA-100 (manufactured by Mitsubishi Kasei Corp.) (20 parts) was added to the solution. After premixing, dispersion was carried out by means of Eiger Mill (manufactured by Eiger Japan) to an average pigment particle diameter of 100 nm (percentage beads packing 70%, media diameter 0.7 mm) to obtain pigment 1 as a pigment dispersion. For pigment 1, the average diameter of dispersed particles was 105 nm.

Pigment 2

A dispersion of pigment 2 was prepared in the same manner as used in the preparation of the dispersion of Pigment 1. For pigment 2, the average diameter of dispersed particles was 85 nm.

Pigments 3 and 4

Pigments 3 and 4 were prepared by oxidizing (nitrating) the surface of carbon black to introduce a carbonyl-terminated group and/or a carboxyl-terminated group into the surface of the carbon black. Pigments 3 and 4 respectively had an average diameter of dispersed particles of 90 nm and an average diameter of dispersed particles of 80 nm.

In the following description, dye 1 is Direct Black 154, dye 2 Direct Yellow 132, dye 3 Direct Blue 86, and dye 4 Acid Red 52.

| Example C1 | Amount added (wt %) |
|---|---|
| Pigment 1 | 5.0 |
| Compound C1 of formula (I) | 15.0 |
| DEGmBE | 2.0 |
| Glycerin | 6.0 |
| 1,5-Pentanediol | 5.0 |
| Triethanolamine | 0.8 |
| Ion-exchanged water | Balance |

The compound C1 of formula (I) is a compound of formula (I) wherein R represents a neopentyl group, n is 1.0, m is 1.5, and T represents $SO_3M$ wherein M represents sodium.

Example C2

| | |
|---|---|
| Pigment 2 | 4.5 |
| Compound C2 of formula (I) | 10.0 |
| Dipropylene glycol | 5.0 |
| Surfynol 465 | 1.2 |
| Triethanolamine | 0.9 |
| Ion-exchanged water | Balance |

The compound C2 of formula (I) is a compound of formula (I) wherein R represents a t-butyl group, n is 1.0, m is 2.0, and T represents $SO_3M$ wherein M represents triethanolamine.

Example C3

| | |
|---|---|
| Pigment 3 | 5.5 |
| Compound C3 of formula (I) | 10.0 |
| Diethylene glycol | 7.0 |
| Thiodiglycol | 3.5 |
| 1,6-Hexanediol | 5.0 |
| Triethanolamine | 1.0 |
| Potassium hydroxide | 0.1 |
| Ion-exchanged water | Balance |

The compound C3 of formula (I) is a compound of formula (I) wherein R represents a 1,3-dimethylbutyl group, n is 0, m is 4.5, and T represents $SO_3M$ wherein M represents H.

Example C4

| | |
|---|---|
| Pigment 4 | 5.0 |
| Dye 1 | 1.0 |
| Compound C4 of formula (I) | 8.0 |
| TEGmBE | 3.0 |
| Diethylene glycol | 3.0 |
| 1,5-Pentanediol | 2.0 |
| Dimethyl-2-imidazolidinone | 2.0 |
| Sodium benzoate | 0.1 |
| Triethanolamine | 0.7 |
| Ion-exchanged water | Balance |

The compound C4 of formula (I) is a compound of formula (I) wherein R represents an isobutyl group, n is 3.0, m is 1.0, and T represents $SO_3M$ wherein M represents ammonia.

Example C5

| | |
|---|---|
| Pigment 1 | 3.0 |
| Dye 1 | 1.0 |
| Compound C5 of formula (I) | 7.0 |
| DEGmBE | 2.0 |
| Glycerin | 14.0 |
| Triethanolamine | 0.9 |
| Ion-exchanged water | Balance |

The compound C5 of formula (I) is a mixture of 50% by weight of a compound of formula (I) wherein R represents an n-hexyl group, n is 4.0, m is 1.0, and T represents $SO_3M$ wherein M represents potassium, with 50% by weight of a compound of formula (I) wherein R represents a 2-ethylhexyl group, n is 2.0, m is 1.0, and T represents $SO_3M$ wherein M represents potassium.

Example C6

| | |
|---|---|
| Dye 2 | 5.0 |
| Compound C6 of formula (I) | 6.0 |
| TEGmBE | 4.0 |
| Glycerin | 15.0 |
| Thiodiglycol | 2.0 |
| 1,5-Pentanediol | 1.0 |
| Triethanolamine | 0.9 |
| Ion-exchanged water | Balance |

The compound C4 of formula (I) is a compound of formula (I) wherein R represents a 1,1-dimethylbutyl group, n is 7.0, m is 1.0, and T represents $SO_3M$ wherein M represents lithium.

Example C7

| | |
|---|---|
| Dye 3 | 5.0 |
| Compound C7 of formula (I) | 10.0 |
| DEGmBE | 3.0 |
| Glycerin | 5.0 |
| Trimethylolpropane | 1.0 |
| Trimethylolethane | 1.0 |
| Surfynol 465 | 1.0 |
| Triethanolamine | 0.5 |
| KOH | 0.05 |
| Ion-exchanged water | Balance |

The compound C4 of formula (I) is a mixture of 50% by weight of a compound of formula (I), wherein R represents an n-butyl group, n is 9.0, m is 1.0, and T represents $SO_3M$ wherein M represents sodium, with 50% by weight of a compound of formula (I) wherein R represents an n-heptyl group, n is 3.5, m is 2.0, and T represents $SO_3M$ wherein M represents potassium).

Example C8

| | |
|---|---|
| Dye 4 | 5.5 |
| Compound C8 of formula (I) | 6.0 |
| Glycerin | 5.0 |
| Diethylene glycol | 5.0 |
| Tetrapropylene glycol | 5.0 |
| Triethanolamine | 0.9 |
| KOH | 0.1 |
| Ion-exchanged water | Balance |

The compound C8 of formula (I) is a mixture of 50% by weight of a compound of formula (I), wherein R represents a neopentyl group, n is 0, m is 1.0, and T represents $SO_3M$ wherein M represents potassium, with 30% by weight of a compound of formula (I), wherein R represents an n-pentyl group, n is 2.5, m is 1.0, and T represents $SO_3M$ wherein M represents ammonia, and 20% by weight of a compound of formula (I) wherein R represents an isopentyl group, n is 3.0, m is 1.5, and T represents $SO_3M$ wherein M represents sodium.

Comparative Example C

Comparative Example C1

| | |
|---|---|
| Pigment 1 | 5.0 |
| Glycerin | 10.0 |
| Dispersant | 3.0 |
| Nonionic surfactant | 1.0 |
| Ion-exchanged water | Balance |

Nonionic surfactant: Noigen EA-160 manufauctured by Dai-ichi Kogyo Seiyaku Co., Ltd.

| Comparative Example C2 | |
|---|---|
| Dye 2 | 5.5 |
| DEGmME | 7.0 |
| Diethylene glycol | 10.0 |
| 2-Pyrrolidone | 5.0 |
| Ion-exchanged water | Balance |
| Comparative Example C3 | |
| Pigment 3 | 5.5 |
| Dye 1 | 2.5 |
| Diethylene glycol | 10.0 |
| Nonionic surfactant | 1.0 |
| Ion-exchanged water | Balance |

Nonionic surfactant: Evan 450 manufactured by Dai-ichi Kogyo Seiyaku Co., Ltd.

Print Evaluation Test

In the same manner as in Examples A1 to A8 and Comparative Examples B1 to B3, the inks of Examples C1 to C8 and Comparative Examples C1 to C3 were subjected to a print evaluation test, and the prints were evaluated for feathering. The results were as summarized in the following table.

| | Example C | | | | | | | | Comparative Example C | | |
|---|---|---|---|---|---|---|---|---|---|---|---|
| | 1 | 2 | 3 | 4 | 5 | 6 | 7 | 8 | 1 | 2 | 3 |
| Conqueror | A | A | A | A | A | A | A | A | C | C | C |
| Favorit | A | A | A | A | A | A | A | A | D | D | D |
| Modo Copy | A | A | A | A | A | A | A | A | C | D | D |
| Rapid Copy | A | A | A | A | A | A | A | A | D | D | D |
| EPSON EPP | A | A | A | A | A | A | A | A | C | C | D |
| Xerox P | A | A | A | A | A | A | A | A | C | C | D |
| Xerox 4024 | A | A | A | A | A | A | A | A | D | D | D |
| Xerox 10 | A | A | A | A | A | A | A | A | C | D | D |
| Neenha Bond | A | A | A | A | A | A | A | A | C | D | D |
| Ricopy 6200 | A | A | A | A | A | A | A | A | D | C | D |
| Yamayuri | A | A | A | A | A | A | A | A | D | D | D |
| Xerox R | A | A | A | A | A | A | A | A | D | D | D |

Storage Stability Test

The inks prepared in Examples C1 to C8 were placed in sample bottles made of glass. The bottles were hermetically sealed, and allowed to stand at 60° C. for one week. At the end of this storage period, the inks were inspected for a change in occurrence sediments and a change in property values (viscosity and surface tension) from the inks before the standing. As a result, for all the inks, substantially no change occurred in occurrence of sediments and in property values.

Example D

Pigment Dispersion

Pigment dispersions used in Examples D1 to D4 were prepared as follows. A styrene/acrylic acid copolymer (weight average molecular weight 25000, acid value 200) (4 parts), 2.7 parts of triethanolamine, 0.4 part of isopropyl alcohol, and 72.9 parts of ion-exchanged water were completely dissolved in one another with heating at 70° C. Carbon black MA-100 (manufactured by Mitsubishi Kasei Corp.) (20 parts) was added to the solution. After premixing, dispersion was carried out by means of Eiger Mill (manufactured by Eiger Japan) to an average pigment particle diameter of 100 nm (percentage beads packing 70%, media diameter 0.7 mm) to obtain a pigment as a pigment dispersion. For the pigment thus obtained, the average diameter of dispersed particles was 105 nm.

Water-Soluble Pigment

The water-soluble pigment used in Example D5 is a water-soluble pigment prepared by oxidizing (nitrating) the surface of carbon black to introduce a carbonyl-terminated group and/or a carboxyl-terminated group into the surface. The average diameter of dispersed particles was 120 nm.

The compound of formula (I) used in example D is a mixture of compounds of formula (I) wherein EO represents —$CH_2CH_2O$—, PO represents —$CH(CH_3)$—$CH_2O$—, and T represents OH, R, EO, PO, and T being attached to one another in that order to represent formula R—(EO)n-(PO)m-T.

| Example D1 | Amount added (wt %) |
|---|---|
| Pigment dispersion 1 | 5.0 |
| Compound D1 of formula (I) | 8.0 |
| DEGmBE | 2.0 |
| Glycerin | 6.0 |
| 1,5-Pentanediol | 5.0 |
| Triethanolamine | 0.8 |
| Ion-exchanged water | Balance |

The compound D1 of formula (I) is a compound of formula (I) wherein R represents a neopentyl group, n is 3, and m is 1.5.

Example D2

| | |
|---|---|
| Pigment dispersion | 4.5 |
| Compound D2 of formula (I) | 10.0 |
| Dipropylene glycol | 5.0 |
| Surfynol 465 | 1.2 |
| Triethanolamine | 0.9 |
| Ion-exchanged water | Balance |

The compound D2 of formula (I) is a compound of formula (I) wherein R represents a t-butyl group, n is 3, and m is 1.3.

Example D3

| | |
|---|---|
| Pigment dispersion | 5.5 |
| Compound D3 of formula (I) | 10.0 |
| Diethylene glycol | 7.0 |

-continued

| | |
|---|---|
| Thiodiglycol | 3.5 |
| 1,6-Hexanediol | 5.0 |
| Triethanolamine | 1.0 |
| Potassium hydroxide | 0.1 |
| Ion-exchanged water | Balance |

The compound D3 of formula (I) is a compound of formula (I) wherein R represents a 1,3-dimethylbutyl group, n is 3, and m is 1.5.

Example D4

| | |
|---|---|
| Pigment dispersion | 5.0 |
| Compound D4 of formula (I) | 8.0 |
| TEGmBE | 3.0 |
| Diethylene glycol | 3.0 |
| 1,5-pentanediol | 2.0 |
| Dimethyl-2-imidazolidinone | 2.0 |
| Sodium benzoate | 0.1 |
| Triethanolamine | 0.7 |
| Ion-exchanged water | Balance |

The compound D4 of formula (I) is a compound of formula (I) wherein R represents an isobutyl group, n is 3, and m is 0.5.

Example D5

| | |
|---|---|
| Water-soluble pigment | 3.0 |
| Compound D5 of formula (I) | 7.0 |
| DEGmBE | 2.0 |
| Glycerin | 14.0 |
| Triethanolamine | 0.9 |
| Ion-exchanged water | Balance |

The compound D5 of formula (I) is a mixture of 50% by weight of a compound of formula (I), wherein R represents an n-hexyl group, n is 4, and m is 2, with 50% by weight of a compound of formula (I) wherein R represents a 2-ethylhexyl group, n is 4, and m is 0.

Evaluation Test

The inks prepared in Examples D1 to D5 were printed on Conqueror, Favorit, Modo Copy, Rapid Copy, EPSONEPP, Xerox 4024, Xerox 10, Neenha Bond, Ricopy 6200, Yamayuri, and Xerox R papers. The prints were inspected for the sharpness of edges and the rapid dryness of printed images and evaluated according to the following criteria. The evaluation results were expressed in terms of the average value on data for the various papers.

Item 1. Sharpness of edge

A: Most of printed patterns were free from feathering and having sharp edges independently of types of papers B: For some printed patterns, somewhat unsharped edges having no practical problem were found with the difference in edge sharpness being small among types of papers.

C: For all the types or some types of papers, the printed patterns suffered from unsharped edges and image burring and were unsuitable for practical use.

Item 2. Rapid dryness

A: 30 sec after printing, touching of the prints by a finger did not cause smearing.

B: 30 sec after printing, touching of the prints by a finger caused smearing.

The results were as summarized in the following table.

| Example No. | D1 | D2 | D3 | D4 | D5 |
|---|---|---|---|---|---|
| Evaluation 1 | B | A | B | A | B |
| Evaluation 2 | A | A | A | A | A |

Example E

In the following examples, water-soluble pigments 1 to 4 are water-soluble pigments prepared by oxidizing the surface of carbon black having a particle diameter of 10 to 300 nm to introduce a carbonyl-terminated group, a carboxyl-terminated group, a hydroxyl-terminated group and/or a sulfone-terminated group into the surface of the carbon black. The average particle diameter of the water-soluble pigments was as indicated in parentheses (unit: nm).

The compound of formula (I) used in Example E is a mixture of a compound of formula (I), wherein T represents OH, R. EO, PO, and T being attached to one another in that order to represent formula R—(EO)n1-(PO)m1-T, with a compound of formula (I) wherein T represents a hydrogen atom, R, PO, EO, and T being attached to one another in that order to represent formula R—(PO)m2-(EO)n2-t. The former compound will be hereinafter referred to as "compound (I-1)," while the latter compound will be hereinafter referred to as "compound (I-2)."

In the following description, water-soluble dye 1 is Direct Black 154, water-soluble dye 2 Direct Yellow 132, water-soluble dye 3 Direct Blue 86, and water-soluble dye 4 Acid Red 52.

Into all the inks described below were added 0.1 to 1% by weight of Proxel XL-2 as a corrosion preventive for inks and 0.001 to 0.05% by weight of benzotriazole as a corrosion preventive for an ink jet head member.

| Example E1 | Amount added (wt %) |
|---|---|
| Water-soluble pigment 1 (105) | 5.0 |
| Compound E1 of formula (I-1) | 1.0 |
| Compound E1 of formula (I-2) | 1.0 |
| DEGmBE | 3.0 |
| Polymeric fine particle A | 3.0 |
| Diethylene glycol | 16.0 |
| 2-Pyrrolidone | 5.0 |
| Ion-exchanged water | Balance |

The compound E1 of formula (I-1) is a compound of formula (I) wherein R1 represents a neopentyl group, n1 is 3, and m1 is 1.5. The compound E1 of formula (I-2) is a compound of formula (I) wherein R represents a hexyl group, n2 is 5, and m2 is 2.

Example E2

| | |
|---|---|
| Water-soluble pigment 2 (85) | 4.5 |
| Compound E2 of formula (I-1) | 2.0 |
| Compound E2 of formula (I-2) | 1.0 |
| Polymeric fine particle A | 3.0 |
| Dipropylene glycol | 5.0 |

-continued

| | |
|---|---|
| Surfynol 465 | 1.2 |
| Ion-exchanged water | Balance |

The compound E2 of formula (I-1) is a compound of formula (I) wherein R1 represents a t-butyl group, n1 is 3, and m1 is 1.3. The compound E2 of formula (I-2) is a compound of formula (I) wherein R represents an iso-butyl group, n2 is 3, and m2 is 1.

Example E3

| | |
|---|---|
| Water-soluble pigment 3 (90) | 5.5 |
| Compound E3 of formula (I-1) | 1.0 |
| Compound E3 of formula (I-2) | 2.0 |
| Polymeric fine particle B | 10.0 |
| Diethylene glycol | 7.0 |
| Thiodiglycol | 3.5 |
| 1,6-Hexanediol | 5.0 |
| Potassium hydroxide | 0.1 |
| Ion-exchanged water | Balance |

The compound E3 of formula (I-1) and the compound E3 of formula (I-2) each are a compound of formula (I) wherein R represents a 1,3-dimethylbutyl group, n1+n2 is 3, and m1+m2 is 1.5.

Example E4

| | |
|---|---|
| Water-soluble pigment 4 (80) | 5.0 |
| Water-soluble dye 1 | 1.0 |
| Compound E4 of formula (I-1) | 4.0 |
| Compound E4 of formula (I-2) | 4.0 |
| TEGmBE | 3.0 |
| Polymeric fine particle C | 1.0 |
| Diethylene glycol | 3.0 |
| 1,5-Pentanediol | 2.0 |
| Dimethyl-2-imidazolidinone | 2.0 |
| Sodium benzoate | 0.1 |
| Triethanolamine | 0.7 |
| Ion-exchanged water | Balance |

The compound E4 of formula (I-1) and the compound E4 of formula (I-2) each are a compound of formula (I) wherein R represents an isobutyl group, n1+n2 is 3, and m1+m2 is 0.5.

Example E5

| | |
|---|---|
| Water-soluble pigment 1 (105) | 3.0 |
| Water-soluble dye 1 | 1.0 |
| Compound E5 of formula (I-1) | 4.0 |
| Compound E5 of formula (I-2) | 3.0 |
| DEGmBE | 2.0 |
| Polymeric fine particle D | 1.0 |
| Glycerin | 10.0 |
| Diethylene glycol | 4.0 |
| Ion-exchanged water | Balance |

The compound E5 of formula (I-1) and the compound E5 of formula (I-2) each are a mixture of 50% by weight of a compound of formula (I), wherein R represents an n-hexyl group, n1+n2 is 4, and m1+m2 is 2, with 50% by weight of a compound of formula (I) wherein R represents a 2-ethylhexyl group, n1+n2 is 4, and m1+m2 is 0.

Example E6

| | |
|---|---|
| Water-soluble dye 2 | 5.0 |
| Compound E6 of formula (I-1) | 5.0 |
| Compound E6 of formula (I-2) | 1.0 |
| TEGmBE | 4.0 |
| Glycerin | 10.0 |
| Thiodiglycol | 2.0 |
| 1,5-Pentanediol | 1.0 |
| Ion-exchanged water | Balance |

The compound E6 of formula (I-1) and the compound E6 of formula (I-2) each are a compound of formula (I) wherein R represents a 1,1-dimethylbutyl group, n1+n2 is 4, and m1+m2 is 1.

Example E7

| | |
|---|---|
| Water-soluble dye 3 | 5.0 |
| Compound E7 of formula (I-1) | 8.0 |
| Compound E7 of formula (I-2) | 2.0 |
| DEGmBE | 3.0 |
| Glycerin | 5.0 |
| Trimethylolpropane | 1.0 |
| Trimethylolethane | 1.0 |
| Surfynol 465 | 1.0 |
| KOH | 0.05 |
| Ion-exchanged water | Balance |

The compound E7 of formula (I-1) and the compound E7 of formula (I-2) each are a mixture of 50% by weight of a compound of formula (I), wherein R represents a 1,3-dimethylbutyl group, n1+n2 is 3, and m1+m2 is 1, with 50% by weight of a compound of formula (I) wherein R represents an n-heptyl group, n1+n2 is 3.5, and m1+m2 is 1.

Example E8

| | |
|---|---|
| Water-soluble dye 4 | 5.5 |
| Compound E8 of formula (I-1) | 3.0 |
| Compound E8 of formula (I-2) | 3.0 |
| Glycerin | 5.0 |
| Diethylene glycol | 5.0 |
| Tetrapropylene glycol | 5.0 |
| Ion-exchanged water | Balance |

The compound E8 of formula (I-1) and the compound E8 of formula (I-2) each are a mixture of 50% by weight of a compound of formula (I) wherein R represents a neopentyl group, n1+n2 is 1.0, and m1+m2 is 0.3, with 30% by weight of a compound of formula (I) wherein R represents an n-pentyl group, n1+n2 is 2.5, and m1+m2 is 1.0, and 20% by weight of a compound of formula (I) wherein R represents an isopentyl group, n1+n2 is 3.0, m1+m2 is 1.5.

Print Evaluation Test

In the same manner as in Examples A1 to A8 and Comparative Examples B1 to B3, the inks of Examples E1 to E8 were subjected to a print evaluation test, and the prints were evaluated for feathering. The results were as summarized in the following table.

|  | Example E | | | | | | | |
|---|---|---|---|---|---|---|---|---|
|  | 1 | 2 | 3 | 4 | 5 | 6 | 7 | 8 |
| Conqueror | A | A | A | A | A | A | A | A |
| Favorit | A | A | A | A | A | A | A | A |
| Modo Copy | A | A | A | A | A | A | A | A |
| Rapid Copy | A | A | A | A | A | A | A | A |
| EPSON EPP | A | A | A | A | A | A | A | A |
| Xerox P | A | A | A | A | A | A | A | A |
| Xerox 4024 | A | A | A | A | A | A | A | A |
| Xerox 10 | A | A | A | A | A | A | A | A |
| Neenha Bond | A | A | A | A | A | A | A | A |
| Ricopy 6200 | A | A | A | A | A | A | A | A |
| Yamayuri | A | A | A | A | A | A | A | A |
| Xerox R | A | A | A | A | A | A | A | A |

Example F

In the following examples, water-soluble pigments 1 to 4 are water-soluble pigments prepared by oxidizing the surface of a carbon black or an organic pigment having a particle diameter of 10 to 300 nm to introduce a carbonyl-terminated group, a carboxyl-terminated group, a hydroxyl-terminated group and/or a sulfone-terminated group into the surface of the carbon black or organic pigment. The average particle diameter of the water-soluble pigments was as indicated in parentheses (unit: nm).

In the following description, water-soluble dye 1 is Direct Black 154, water-soluble dye 2 Direct Yellow 132, water-soluble dye 3 Direct Blue 86, and water-soluble dye 4 Acid Red 52.

| Example F1 | Amount added (wt %) |
|---|---|
| Water-soluble pigment 1 (105) | 5.0 |
| Compound F1 of formula (I) | 8.0 |
| DEGmBE | 2.0 |
| Glycerin | 6.0 |
| 1,5-Pentanediol | 5.0 |
| Triethanolamine | 0.8 |
| Ion-exchanged water | Balance |

Compound F1 of formula (I) is a compound of formula (I) wherein R represents a (2-tetrahydrofuran)methyloxy group, m is 1.5, and n is 3. Water-soluble pigment 1 is a carbon black which has been surface treated to attach mainly carboxyl groups onto the surface of the carbon black.

| Example F2 | |
|---|---|
| Water-soluble pigment 2 (85) | 4.5 |
| Compound F2 of formula (I) | 10.0 |
| Dipropylene glycol | 5.0 |
| Surfynol 465 | 1.2 |
| Triethanolamine | 0.9 |
| Ion-exchanged water | Balance |

Compound F2 of formula (I) is a compound of formula (I) wherein R represents a cyclohexyloxy group, m is 1.3, and n is 6. Water-soluble pigment 2 is a carbon black which has been surface treated to attach mainly sodium sulfonate groups onto the surface of the carbon black.

| Example F3 | |
|---|---|
| Water-soluble pigment 3 (90) | 5.5 |
| Compound F3 of formula (I) | 10.0 |
| Diethylene glycol | 7.0 |
| Thiodiglycol | 3.5 |
| 1,6-Hexanediol | 5.0 |
| Triethanolamine | 1.0 |
| Potassium hydroxide | 0.1 |
| Ion-exchanged water | Balance |

Compound F3 of formula (I) is a mixture of 80% by weight of a compound of formula (I), wherein R represents a benzyloxy group, m is 1.5, and n is 3, with 20% by weight of a compound of formula (I), wherein R represents an α-ethylbenzyloxy group, m is 1.5, and n is 6. Water-soluble pigment 3 is a pigment prepared by surface treating quinacridone to attach mainly sulfonic acid groups onto the surface of quinacridone.

| Example F4 | |
|---|---|
| Water-soluble pigment 4 (80) | 5.0 |
| Water-soluble dye 1 | 1.0 |
| Compound F4 of formula (I) | 8.0 |
| TEGmBE | 3.0 |
| Diethylene glycol | 3.0 |
| 1,5-Pentanediol | 2.0 |
| Dimethyl-2-imidazolidinone | 2.0 |
| Sodium benzoate | 0.1 |
| Triethanolamine | 0.7 |
| Ion-exchanged water | Balance |

Compound F4 of formula (I) is a compound of formula (I) wherein R represents a cyclohexylmethyloxy group, m is 0.5, and n is 5. Water-soluble pigment 4 is a pigment prepared by surface treating phthalocyanine to attach mainly sulfonic acid groups onto the surface of phthalocyanine.

| Example F5 | |
|---|---|
| Water-soluble pigment 1 (105) | 3.0 |
| Water-soluble dye 1 | 1.0 |
| Compound F5 of formula (I) | 7.0 |
| DEGmBE | 2.0 |
| Glycerin | 14.0 |
| Triethanolamine | 0.9 |
| Ion-exchanged water | Balance |

Compound F5 of formula (I) is a mixture of 50% by weight of a compound of formula (I), wherein R represents an α-naphthyloxy group, m is 2, and n is 10, with 50% by weight of a compound of formula (I) wherein R represents a cycloheptyloxy group, m is 0, and n is 4.

| Example F6 | |
|---|---|
| Water-soluble dye 2 | 5.0 |
| Compound F6 of formula (I) | 6.0 |
| TEGmBE | 4.0 |
| Glycerin | 15.0 |
| Thiodiglycol | 2.0 |
| 1,5-Pentanediol | 1.0 |

-continued

| Example F6 | |
|---|---|
| Triethanolamine | 0.9 |
| Ion-exchanged water | Balance |

Compound F6 of formula (I) is a compound of formula (I) wherein R represents a cyclopentyloxy group, m is 1, and n is 7.

| Example F7 | |
|---|---|
| Water-soluble dye 3 | 5.0 |
| Compound F7 of formula (I) | 10.0 |
| DEGmBE | 3.0 |
| Glycerin | 5.0 |
| Trimethylolpropane | 1.0 |
| Trimethylolethane | 1.0 |
| Surfynol 465 | 1.0 |
| Triethanolamine | 0.5 |
| KOH | 0.05 |
| Ion-exchanged water | Balance |

Compound F7 of formula (I) is a mixture of 50% by weight of a compound of formula (I), wherein R represents a p-methylbenzyloxy group, m is 1, and n is 9, with 50% by weight of a compound of formula (I) wherein R represents a o-methylbenzyloxy group, m is 1, and n is 5.5.

| Example F8 | |
|---|---|
| Water-soluble dye 4 | 5.5 |
| Compound F8 of formula (I) | 6.0 |
| 1,2-Hexanediol | 1.5 |
| Glycerin | 5.0 |
| Diethylene glycol | 5.0 |
| Tetrapropylene glycol | 5.0 |
| Triethanolamine | 0.9 |
| KOH | 0.1 |
| Ion-exchanged water | Balance |

Compound F8 of formula (I) is a mixture of 50% by weight of a compound of formula (I), wherein R represents a 2-methylphenyl-1-oxy group, m is 0.3, and n is 6, with 30% by weight of a compound of formula (I), wherein R represents an 4-t-butylphenyl-1-oxy group, m is 1, and n is 7, and 20% by weight of a compound of formula (I) wherein R represents a 4-t-butylphenylmethlyoxy group, m is 1.5, and n is 4.5.

The results of evaluation were as summarized in the following table.

| | Example F | | | | | | | |
|---|---|---|---|---|---|---|---|---|
| | 1 | 2 | 3 | 4 | 5 | 6 | 7 | 8 |
| Conqueror | A | A | A | A | A | A | A | A |
| Favorit | A | A | A | A | A | A | A | A |
| Modo Copy | A | A | A | A | A | A | A | A |
| Rapid Copy | A | A | A | A | A | A | A | A |
| EPSON EPP | A | A | A | A | A | A | A | A |
| Xerox P | A | A | A | A | A | A | A | A |
| Xerox 4024 | A | A | A | A | A | A | A | A |
| Xerox 10 | A | A | A | A | A | A | A | A |

-continued

| | Example F | | | | | | | |
|---|---|---|---|---|---|---|---|---|
| | 1 | 2 | 3 | 4 | 5 | 6 | 7 | 8 |
| Neenha Bond | A | A | A | A | A | A | A | A |
| Ricopy 6200 | A | A | A | A | A | A | A | A |
| Yamayuri | A | A | A | A | A | A | A | A |
| Xerox R | A | A | A | A | A | A | A | A |

What is claimed is:

1. An ink for ink jet recording, comprising at least a water-soluble colorant, a water-soluble organic solvent, water, and a mixture of two or more compound represented by formula (I):

$$R-([(EO)n-(PO)m]-T)k \qquad (I)$$

wherein

EO represents an ethyleneoxy group;

PO represents a propyleneoxy group;

T represents an OH group or $SO_3M$ wherein M represents a hydrogen atom, an alkali metal, an inorganic base, or an organic amine;

m and n are each an integer;

k is a natural number of not less than 1; and

R represents a $CaH_{2a+2-k}$ group where "a" represents natural number of 4 to 10, an $Ra-CaH_{2a+1-k}$ group where "a" represents natural number of 4 to 10 and Ra represents a group represented by the following formula:

$$(T-[(PO)m'-(EO)n'])k-$$

wherein

EO, PO, T and k each are as defined above; and n' and m' are respectively n and m, EO and PO being arranged, regardless of order in the parentheses, randomly or as blocks joined together, n or n+n' being 1 to 10 with m or m+m' being 0 to 5 when n and m and n' and m' are expressed in terms of the average value for the mixture of compounds represented by formula (I) contained in the ink.

2. The ink according to claim 1, wherein the compounds, represented by formula (I), constituting the mixture each are such that T represents an OH group.

3. The ink according to claim 1, wherein the compounds, represented by formula (I), constituting the mixture each is such that R represents a $C_aH_{2a+2-k}$ group and T represents $SO_3M$.

4. The ink according to claim 1, wherein the compounds, represented by formula (I), constituting the mixture each are such that EO represents $-CH_2CH_2O-$, PO represents $-CH(CH_3)-CH_2O-$, and T represents an OH group, R, EO, PO, and T being attached to one another in that order to represent formula R—(EO)n-(PO)m-T.

5. The ink according to claim 1, wherein the mixture of compounds represented by formula (I) is composed of:

a compound represented by formula (I) wherein T represents an OH group, R, EO, PO, and T being attached to one another in that order to represent formula R—(EO)n-(PO)m-T; and a compound represented by formula (I) wherein T represents an OH group, R, EO, PO, and T being attached to one another in that order to represent formula R—(PO)m-(EO)n-T.

6. The ink according to claim 1, wherein n and m in the mixture of compounds represented by formula (I) satisfy $n/m \leq 0.5$.

7. The ink according to claim 1, wherein the compound represented by formula (I) has an average molecular weight of not more than 2000.

8. The ink according to claim 1, wherein the mixture of compounds represented by formula (I) is composed of:
   a compound represented by formula (I) wherein R represents a butyl, pentyl, hexyl, heptyl, octyl, nonyl, or decyl group; and
   a compound represented by formula (I) wherein R represents a butyl, pentyl, hexyl, heptyl, octyl, nonyl, or decyl group.

9. The ink according to claim 1, wherein R represents a straight-chain or branched $C_aH_{2a+2-k}$ group.

10. The ink according to claim 1, which further comprises 0 to 10% by weight of (di) propylene glycol monobutyl ether.

11. The ink according to claim 10, wherein the weight ratio of the compound represented by formula (I) to (di) propylene glycol monobutyl ether is 1:0 to 1:10.

12. The ink according to claim 1, which further comprises 0 to 5% by weight of an acetylene glycol surfactant.

13. The ink according to claim 12, wherein the weight ratio of the compound represented by formula (I) to the acetylene glycol surfactant is 1:0 to 1:3.

14. The ink according to claim 1, which further comprises 0 to 20% by weight of di(tri) ethylene glycol monobutyl ether.

15. The ink according to claim 14, wherein the weight ratio of the compound represented by formula (I) to di(tri) ethylene glycol monobutyl ether is 10 to 1:10.

16. The ink according to claim 1, wherein the water-soluble colorant is a water-soluble dye and/or a water-soluble pigment dispersible in water.

17. An ink jet recording method comprising the steps of: ejecting a droplet of an ink; and depositing the droplet onto a recording medium to perform printing, wherein the ink is one according to claim 1.

18. A recorded medium recorded by the ink jet recording method according to claim 17.

19. The ink according to claim 1, wherein R represents a branched $C_4$–$C_{20}$ group.

* * * * *